(12) United States Patent
Breuer et al.

(10) Patent No.: US 8,089,883 B2
(45) Date of Patent: Jan. 3, 2012

(54) METHOD FOR CONTROLLING TRANSMISSIONS BETWEEN NEIGHBORING NODES IN RADIO COMMUNICATIONS SYSTEM AND ACCESS NODE THEREOF

(75) Inventors: Volker Breuer, Bötzow (DE); Norbert Kroth, Potsdam (DE); Thomas Ulrich, Bad Dürkheim (DE); Richard Waldhauser, München (DE)

(73) Assignee: Nokia Siemens Networks GmbH & Co. KG, Munich (DE)

( * ) Notice: Subject to any disclaimer, the term of this patent is extended or adjusted under 35 U.S.C. 154(b) by 0 days.

(21) Appl. No.: 12/312,913

(22) PCT Filed: Nov. 27, 2007

(86) PCT No.: PCT/EP2007/062891
§ 371 (c)(1),
(2), (4) Date: Jan. 15, 2010

(87) PCT Pub. No.: WO2008/065115
PCT Pub. Date: Jun. 5, 2008

(65) Prior Publication Data
US 2010/0128681 A1    May 27, 2010

(30) Foreign Application Priority Data
Dec. 1, 2006   (EP) .................................... 06024960

(51) Int. Cl.
*G01R 31/08*    (2006.01)

(52) U.S. Cl. .......... 370/236; 370/329; 370/349
(58) Field of Classification Search .......... 370/230–238, 370/328–339, 349–350, 389–391; 455/450, 455/524
See application file for complete search history.

(56) References Cited

U.S. PATENT DOCUMENTS

| | | | | |
|---|---|---|---|---|
| 6,567,397 | B1 * | 5/2003 | Campana et al. | 370/349 |
| 7,853,286 | B2 * | 12/2010 | Ryu et al. | 455/524 |
| 2006/0062180 | A1 * | 3/2006 | Sayeedi et al. | 370/328 |
| 2008/0043623 | A1 * | 2/2008 | Franceschini et al. | 370/235 |
| 2010/0167746 | A1 * | 7/2010 | Lee et al. | 455/450 |

FOREIGN PATENT DOCUMENTS

| | | |
|---|---|---|
| DE | 196 49 653 A1 | 6/1998 |
| EP | 1 335 556 A1 | 8/2003 |

OTHER PUBLICATIONS

International Search Report for Application No. PCT/EP2007/062891; mailed Mar. 26, 2008.

* cited by examiner

*Primary Examiner* — Pao Sinkantarakorn
*Assistant Examiner* — Iqbal Zaidi
(74) *Attorney, Agent, or Firm* — Staas & Halsey LLP

(57) ABSTRACT

At least one request between neighboring access nodes in a radio communications system is transmitted after verifying a class of the at least one request being transmitted between the neighboring access nodes, where the class assigned by an access node indicates a priority of the request. Based upon the verified class, the transmission of the request is controlled.

11 Claims, 3 Drawing Sheets

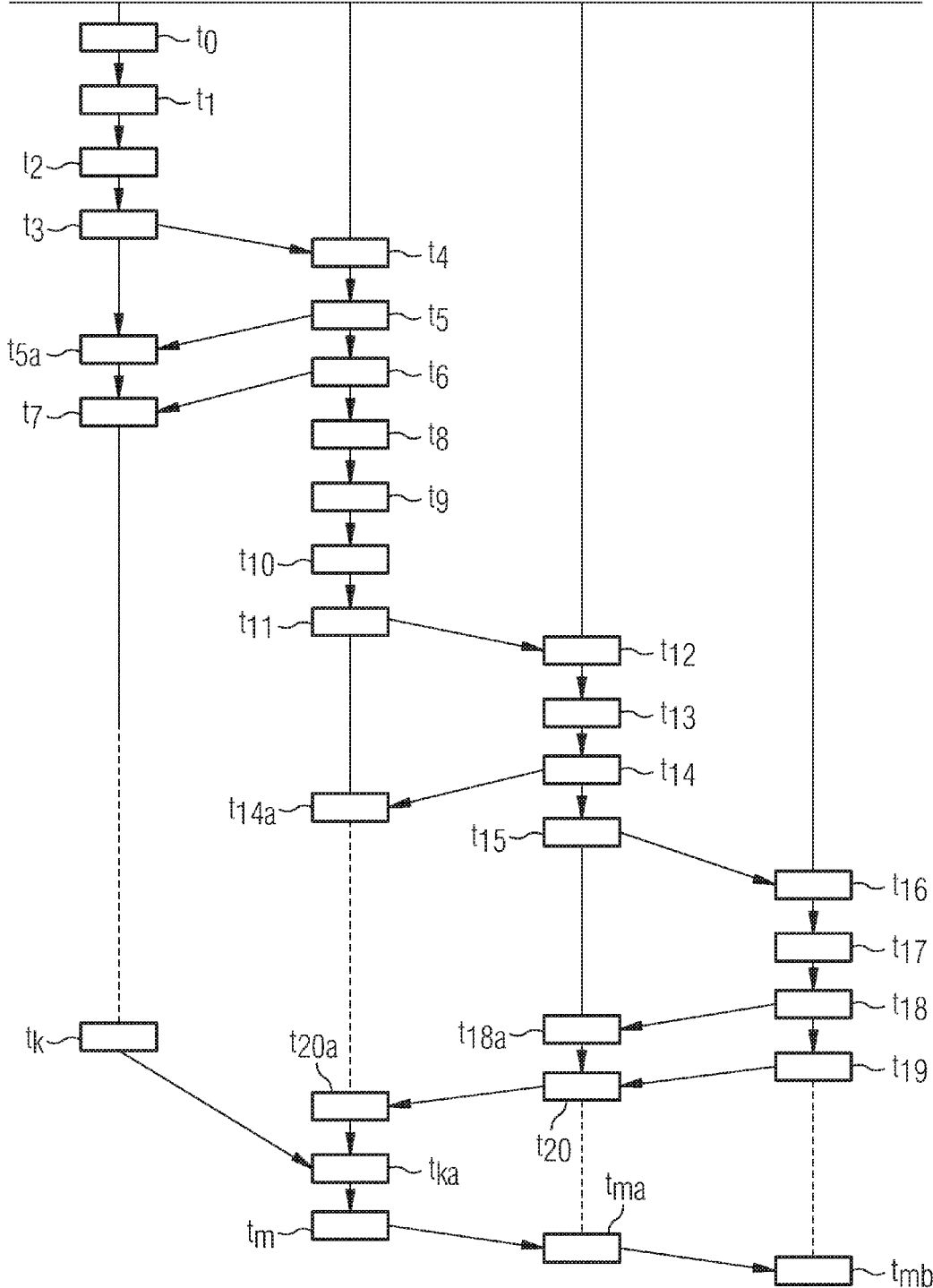

METHOD FOR CONTROLLING TRANSMISSIONS BETWEEN NEIGHBORING NODES IN RADIO COMMUNICATIONS SYSTEM AND ACCESS NODE THEREOF

CROSS REFERENCE TO RELATED APPLICATIONS

This application is the U.S. national stage of International Application No. PCT/EP2007/062891, filed Nov. 27, 2007 and claims the benefit thereof. The International Application claims the benefits of European Application No. 06024960 filed on Dec. 1, 2006, both applications are incorporated by reference herein in their entirety.

BACKGROUND

Described below is a method used in radio communications systems to ensure that transmissions between neighboring nodes are controlled.

In radio communications systems beyond 3G (3rd Generation Wireless Mobile Communication Technology) subscribers will have the opportunity to choose from a plurality of services provided from network operators when using UEs (User Equipments). Additionally, as the number of UEs increases steadily, network operators have to ensure that radio resources are available so that requests for services can be served and no degradation of the requested services occurs due to lack of radio resources.

As it is also becoming all the more important for radio resources to be available, RRM (Radio Resource Management) has been implemented in order to allocate and manage radio resources in radio communications systems. In order to reduce the amount of traffic generated in a radio communications system by radio resource requests, RRM is distributed throughout the system. In this way, the radio communications system is divided into well defined areas, each area having an assigned RRM unit for managing and allocating radio resources.

However, this requires that the numerous RRM units within the radio communications system be highly co-ordinated so that the allocation and the management of the radio resources can be performed efficiently, promptly and without degradation to a requested service.

Furthermore, in the event that the number of radio resources available to a RRM unit is not adequate and in order to avoid having to reduce the efficiency of the radio communications system by either rejecting a service request or accepting it with a reduced quality of service, the RRM unit has to request additional radio resources from neighboring RRM units.

Additionally, apart from requests for services that require radio resources, radio resources must always be available for certain operations that might occur in the radio communications system. For example, when a UE located within a defined area, for example a cell, under the control of a RRM unit moves to another defined area which is under the control of a further RRM unit, i.e. a handover operation is to be executed, radio resources have to be available in order to enable the handover to proceed. Such a procedure leads to an increase in the amount of signalling present as apart from the signalling of radio resource requests between the RRM units, signalling between the UE and the node controlling the area in which the UE is going to enter, known also as the target node, has to be executed as well as signalling between the node actually controlling the UE, also known as the source node, and the target node. All this signalling requires radio resources to be available in order to allow such an operation to be executed efficiently and in a timely manner.

The need to generate requests for radio resources at the RRM unit and then transmit them to neighboring unit and then wait for a response, further reduces the efficiency of the radio communications system. Moreover, as long as the radio resources are not available, the RRM unit will transmit such requests, increasing the amount of traffic present, further reducing the efficiency.

A need therefore exists for a technique that resolves the above mentioned issues as well as providing a way of controlling and managing the allocation of radio resources by RRM units in a manner that balances the needs and requirements of UEs present with the radio resources available without causing undue loss of efficiency within the system. Furthermore, a need exists for such a technique to manage the available radio resources and resolve the above mentioned issues in a dynamic manner in order to guarantee a high system efficiency and a high quality of service as well as reducing the amount of signalling traffic being propagated through the radio communications system. A need furthermore exists for an apparatus that can implement such a technique.

SUMMARY

In radio communications systems beyond 3G (3rd Generation Wireless Mobile Communication Technology) subscribers will have the opportunity to choose from a plurality of services provided from network operators when using UEs (User Equipments). Additionally, as the number of UEs increases steadily, network operators have to ensure that radio resources are available so that requests for services can be served and no degradation of the requested services occurs due to lack of radio resources.

As it is also becoming all the more important for radio resources to be available, RRM (Radio Resource Management) has been implemented in order to allocate and manage radio resources in radio communications systems. In order to reduce the amount of traffic generated in a radio communications system by radio resource requests, RRM is distributed throughout the system. In this way, the radio communications system is divided into well defined areas, each area having an assigned RRM unit for managing and allocating radio resources.

However, this requires that the numerous RRM units within the radio communications system be highly co-ordinated so that the allocation and the management of the radio resources can be performed efficiently, promptly and without degradation to a requested service.

Furthermore, in the event that the number of radio resources available to a RRM unit is not adequate and in order to avoid having to reduce the efficiency of the radio communications system by either rejecting a service request or accepting it with a reduced quality of service, the RRM unit has to request additional radio resources from neighboring RRM units.

Additionally, apart from requests for services that require radio resources, radio resources must always be available for certain operations that might occur in the radio communications system. For example, when a UE located within a defined area, for example a cell, under the control of a RRM unit moves to another defined area which is under the control of a further RRM unit, i.e. a handover operation is to be executed, radio resources have to be available in order to enable the handover to proceed. Such a procedure leads to an increase in the amount of signalling present as apart from the signalling of radio resource requests between the RRM units, signalling between the UE and the node controlling the area in which the UE is going to enter, known also as the target node, has to be executed as well as signalling between the node actually controlling the UE, also known as the source node, and the target node. All this signalling requires radio resources to be available in order to allow such an operation to be executed efficiently and in a timely manner.

The need to generate requests for radio resources at the RRM unit and then transmit them to neighboring unit and then wait for a response, further reduces the efficiency of the radio communications system. Moreover, as long as the radio resources are not available, the RRM unit will transmit such requests, increasing the amount of traffic present, further reducing the efficiency.

A need therefore exists for a technique that resolves the above mentioned issues as well as providing a way of controlling and managing the allocation of radio resources by RRM units in a manner that balances the needs and requirements of UEs present with the radio resources available without causing undue loss of efficiency within the system. Furthermore, a need exists for such a technique to manage the available radio resources and resolve the above mentioned issues in a dynamic manner in order to guarantee a high system efficiency and a high quality of service as well as reducing the amount of signalling traffic being propagated through the radio communications system. A need furthermore exists for an apparatus that can implement such a technique.

Using the method described below, the above mentioned issues are resolved.

The method controls a transmission of at least one request between a first access node of a plurality of access nodes and at least one neighboring access node of the plurality of access nodes, the request being a radio resource request, in a radio communications system, including verifying a class of a plurality of classes of the at least one request to be transmitted, the class being assigned by the first access node indicating a priority of the at least one request, and controlling the transmission of the at least one request depending upon the verified class.

An independent access node arranged for controlling a transmission of at least one radio resource request, to at least one neighboring access node of a plurality of access nodes in a radio communications system, including a processing device providing verifying means adapted to verify a class of a plurality of classes of the at least one request to be transmitted by a transceiver from the access node to the at least one neighboring access node, the class being assigned by a processing device providing assigning means indicating a priority of the at least one request, and a controller adapted to control the transmission of the at least one request depending upon the verified class.

The proposed technique allows for access nodes in a radio communications system, to better control the transmission of requests to neighboring access nodes. By verifying the class of the request, an access node can then control the transmission of the request and additionally prevent unnecessary radio resource reservation. The class indicates the priority of the request and is assigned by the access node to each request that it generates. In this manner, the access node controls the transmission depending on the class of the request. Requests that do not meet the priority requirements of the appropriate class are prevented from being transmitted through the radio communications system, thus reducing the amount of signalling present and so allowing for an efficient control and management of the available resources. Furthermore, the method described below acts as an attenuating mechanism within the radio communications system, providing a high degree of stability as it hinders or slows down abrupt or sudden radio resource requests that would otherwise change the load balance of the system.

A class assigned to a request can be a class of a plurality of classes, including a first class and at least one further class. In this way requests can be prioritized, for example according to a particular service or operation, allowing for a better control to be applied on the number of requests being transmitted, wherein a first class request can be transmitted immediately, allowing for radio resources to be allocated quickly to such requests.

To further refine control of the transmission, the control can be applied by using at least one of the following: a timer and at least one parameter of the request, where the timer uses a time value and upon expiry transmission of the at least one request that has a class belonging to one of the at least one further class is executed. In this way, the transmission of requests is regulated and load balancing is provided within the radio communications system.

Additionally, the at least one parameter used can indicate at least one of the following: a location of the access node originating the at least one request, an identification of the access node originating the at least one request and a threshold value, whereby when the threshold value is exceeded, transmission of the at least one request having a class belonging to one of the at least one further classes is stopped. In this way, flexibility in the manner by which control of the transmission is further achieved by providing alternative ways by which to evaluate a request.

Furthermore, the access node that implements the method can be at least one of the following: a base station controller, a radio network controller and a base station. In this way, providing for a versatile technique which can be implemented in radio communications systems having different types of architecture.

BRIEF DESCRIPTION OF THE DRAWINGS

These and other aspects and advantages will become more apparent and more readily appreciated from the description given herein below of an exemplary embodiment, taken in conjunction with the accompanying drawings of which:

FIG. 4 is a sequence diagram providing a further illustrative example of the method.

DETAILED DESCRIPTION OF THE PREFERRED EMBODIMENTS

Figure 1:
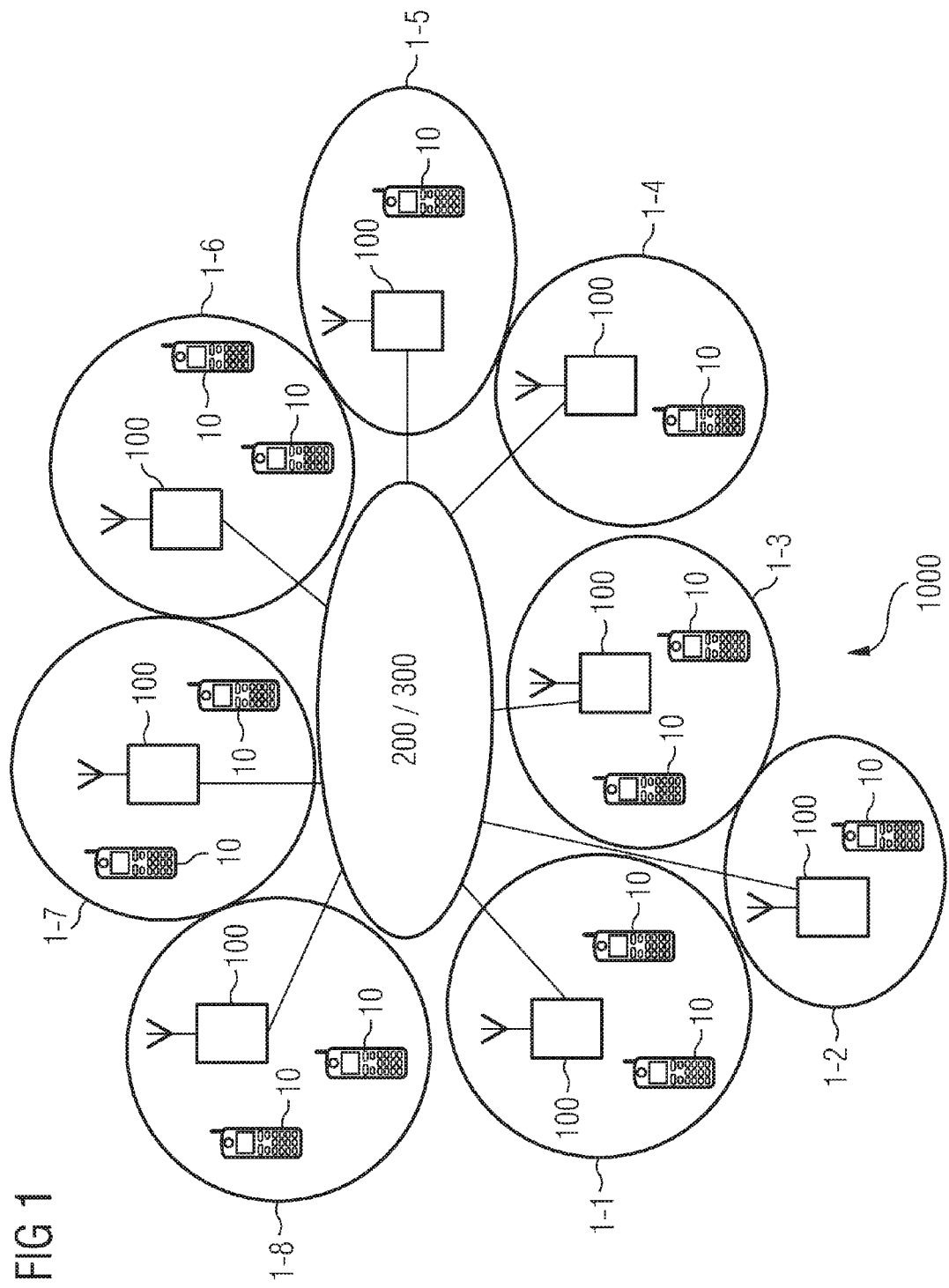
FIG. 1 is a block diagram of a radio communications system wherein the method is applicable.

Reference will now be made in detail to exemplary embodiments illustrated in the accompanying drawings, wherein like reference numerals refer to like elements throughout.

FIG. 1 shows a view of a radio communications system 1000 with a plurality of access nodes 100 that provide the interface for connecting a plurality of UEs 10 to a fixed network 200 such as the internet and/or the PSTN (Public Switched Telephone Network) and/or to other cellular networks 300. In the embodiment depicted in FIG. 1, access node 100 is arranged to operate as a RRM unit for the defined area it controls and can be at least one of the following: a base station controller (BSC), a radio network controller (RNC), a base station (BS), a nodeB and an evolved-nodeB. A UE 10 can be at least one of the following: a mobile station, a mobile or cellular telephone device and a mobile computer device. For reasons of simplicity and ease of understanding, nodes and devices that provide the interface between access nodes 100 and the fixed network 200 and/or the other cellular networks 300 such as MSCs (Mobile Switching Centres), SGSNs (Serving GPRS Support Nodes), MGWs (Media Gateways), GMSCs (Gateway Mobile Switching Centres), aGWs (access Gateways) and/or GGSNs (Gateway GPRS Support Nodes) are not depicted. Nevertheless, a person skilled in the art would be aware of their existence. Each access node 100 controls a defined area 1-1 to 1-8, also known as a cell, providing UEs 10 present within the cell with the necessary connectivity. Furthermore, access nodes 100 are also arranged to be able to communicate with each other within radio communications system 1000. Such communications can include control signalling and/or data signalling.

Access noae 100 of cell 1-1, has to transmit at least one request to access node 100 of cell 1-2 which neighbors cell 1-1. The request in one embodiment is a radio resource reservation request amongst other requests and/or other transmissions possible. The radio resource reservation request transmitted by an access node 100 can be due either to a request for radio resources from a UE 10 present in the cell that the access node 100 controls, a request for radio resources by the access node 100 upon determining that the radio resources that it has are falling below a predefined threshold or a combination of both. Furthermore, each transmitted request is assigned a class out of a plurality of classes, the class indicating the priority of the transmitted request. The plurality of classes includes at least one first class and at least one further class.

The threshold can be a predefined number of sub-carriers being used or being available for use by access node 100, a predefined quality of service parameter or parameters that is determined by access node 100 or a combination of the above. Such a parameter can be, for example, a bit error rate (BER) measured on received transmissions, a number of requests for data retransmission, a determined signal to noise ratio, a number of failed handovers for UEs 10 and so on.

An access node 100 can run out of radio resources that are available for example if the number of UEs 10 present is great, UEs 10 present in the cell request to receive and/or receive services that require a large amount of resources, resources have to be reserved in view of handover procedures necessary for UEs 10 departing and/or leaving the cell, or a combination of the above.

Figure 2A:
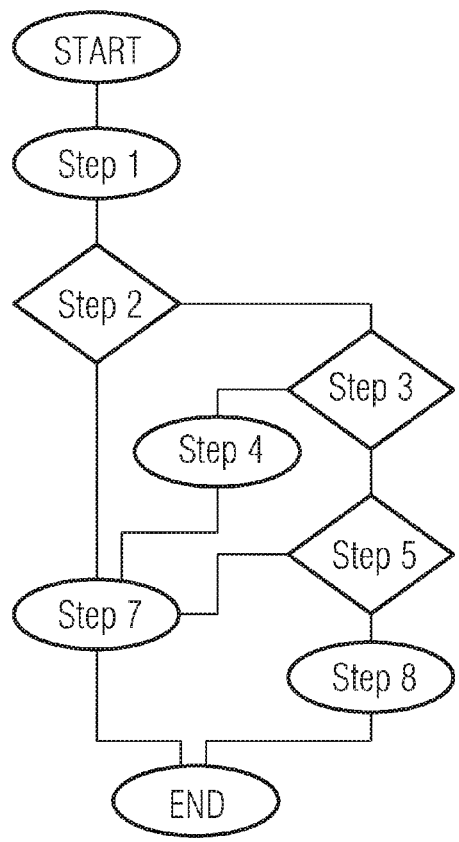
FIG. 2a is a flow chart of the method when an access node generates a request.

FIG. 2a depicts a flow chart form of the method when an access node 100 generates a request. In step 1, access node 100 verifies the class of the request that is to be transmitted to a neighboring access node 100. The class is assigned by access node 100 when generating the request. The class can be one of a plurality of classes. Depending on the verified class of the request, access node 100 controls the transmission of the request in step 2. Upon verifying that the request is a first class request access node immediately transmits it to the neighboring access node 100 in step 7. A first class can be the class indicating a request having the highest priority possible from the plurality of classes. A second class, for example has a priority that is lower than the first and so on. A first class can, for example, be assigned to a request for radio resources that are required for a handover operation or for a service that requires a large amount of dedicated radio resource like for example multimedia conferencing.

Upon verifying that the request is a request having a class belonging to the at least one further class, a further step is performed in step 3, wherein a further control is applied using at least one of the following: a timer and at least one parameter of the request. The manner in which the further control is effectuated can be predefined or dynamically selected by access node 100 depending on gathered statistics, such as, current traffic levels, current processing levels and the like.

When applying the timer for further control of the transmission of the request, step 4 is performed. The timer uses a time value to control the transmission of the request. Upon expiry of the time value, a further class request is allowed to proceed and transmitted in step 7. Prior to the time value expiring, the further class request is stored.

The time value can be predefined, dynamically determined by the access node 100 or can depend on performance indicators monitored by access node 100, such as load situation within the cell of the access node 100, number of already issued requests per class within a time period and so on. Alternatively, in a further refinement of the method, instead of using a timer to control the transmissions, a time window can be used.

In the event that a plurality of further class requests are stored, each further class request is assigned a timer the moment the request is stored. In an alternative embodiment, the timer is assigned after an ordering (or queuing) of the requests is performed based upon the priority indicated by the class of each request.

The at least one parameter of the request indicates at least one of the following: a location of the access node 100 originating the request, an identification of the access node 100 originating the request, a class of the further request and a threshold value.

The application of the threshold value is shown in step 5 of FIG. 2a. The threshold value can be determined, by access node 100, depending on the monitored performance indicators and/or statistical data gathered by the access node 100 or gathered and then transmitted by neighboring access nodes 100. The threshold value acts as a transmission control mechanism for generated requests. As long as the threshold value in not exceeded, access node 100 proceeds with the transmission of the further class request, in step 7. Once the threshold value is exceeded, access node 100 stops the transmission of the further class request in step 8.

The location can be indicated by using the geographical position co-ordinates of the access node 100 or by using a cell reference of the cell that the access node 100 is located in. The identification of the access node 100 can be an access node identifier, for example a numerical identity or a name of the access node, an address of the access node 100 used in radio communications system 1000, for example an IP (Internet Protocol) address, or an identifier indicating the number of hops (hop count) required to reach access node 100 from a defined point of reference within radio communications system 1000 or the number of hops indicating the hops taken by a request from the access node 100 having originated the request.

Figure 2B:
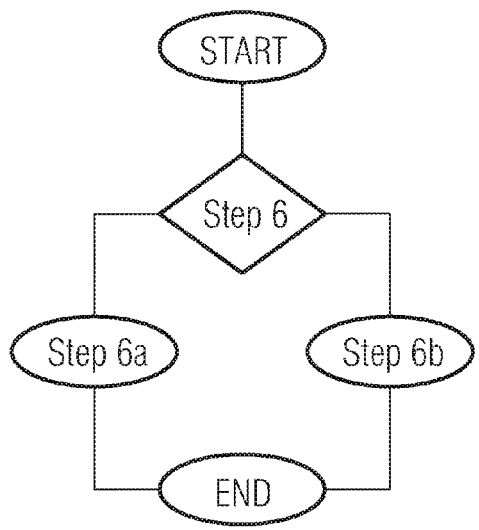
FIG. 2b is a flow chart of the method when an access node receives a request.

In the above description the method has been explained in relation to an access node 100 generates a request. However, as explained herein above, such a generated request when transmitted is in turn received by an adjacent access node 100. FIG. 2b depicts a flow chart of the method when an access node 100 receives such a request.

When receiving a request, access node 100 will apply the identification or the location parameter in step 6. Upon checking the identification or the location parameter, access node 100 can determine the distance to the originating access node 100. The identification and the location parameters act as transmission control mechanisms for received requests. Access node 100 uses them and if the check determines that the request has originated from a neighboring access node 100 or has a small hop count or has a hop count below a set hop count threshold, access node 100 can accept the request in step 6a. If the check determines that the request has originated from a non-neighboring access node 100 or has a large hop count or a hop count above a set hop count threshold, access node 100 can reject the request in step 6b.

For example, as mentioned herein above, if the request to be transmitted is a radio resource reservation request, the transmitting access node 100 using of one or a combination of the above mentioned parameters can control the number of requests being transmitted and so advantageously performs load balancing within the radio communications system 1000. Advantageously also, the neighboring (or adjacent) access node 100 that receives the request can use the one or more parameters to accept or reject the request. When the request is accepted the access node 100 will notify the originating access node 100 of the acceptance of the request and then transfer the requested radio resources. The notification of the acceptance of the request indicates to the originating access node 100 that the neighboring access node 100 has available radio resources to provide to it. When the request is rejected the access node 100 will notify the originating access node 100 of the rejection of the request.

In a further embodiment, a receiving access node 100 upon determining that the request can not be fulfilled i.e. the check determines that the request has originated from a non-neighboring access node 100 or has a large hop count or a hop count above a set hop count threshold or that radio resources are not available, receiving access node 100 can also further transmit the request to another further neighboring access node 100 in order that the request be fulfilled. In this case, receiving access node 100 notifies the originating access node 100 of the rejection of the request and that it will further transmit the request to another further neighboring access node 100. When the request is further transmitted by access node 100, in order to simplify processing and attenuate the number of requests being transmitted access node 100 maintains the original class of the request.

To control the further propagation of requests and to avoid reducing the efficiency of radio communications system 1000 through the propagation of such requests from one access node 100 to another access node 100, the receiving access node 100 upon determining that it can't fulfill the request because it lacks radio resources, checks (or verifies) at least one of the following: a class of the request, a hop count indicating the number of hops that the request has made from the access node 100 that originated it and current statistics indicating the number of requests per class and/or per hop count received from access nodes 100 and further propagated. The information that is checked can be retrieved by access node 100 from the received request and/or from statistical information that is has gathered.

If the executed check results in at least one of the following: that the class indicates a request with a high priority such as a first class, the hop count is below a defined threshold and the current statistics show that the number of received requests per class and/or per hop count is below a defined threshold, the receiving access node 100 can then further propagate the request to a neighboring access node 100. When further transmitting the request the access node 100 will increase the hop count but will leave the class of the request unchanged. In the event that the executed check results in at least one of the following: that the class indicates a low priority and the defined thresholds have been exceeded, access node 100 will not further propagate the request.

In addition to the above, it must be noted that an access node 100 releases the radio resources that it receives after having transmitted a request when they are no longer required. This can occur, for example, when the service requiring the requested radio resources is terminated and/or the radio resources of access node 100 have returned to a predetermined level.

Figure 3:
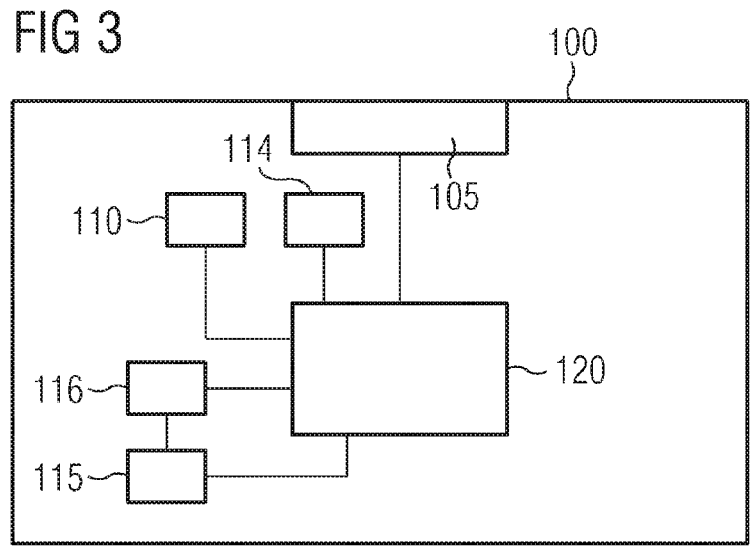
FIG. 3 is a block diagram of a system that implements the method.

FIG. 3 illustrates an access node 100, such as a BSC, a RNC, a BS (Base Station) or the like, in which the method can be implemented using a system described herein below. The method can be implemented using software and hardware elements in at least one of the following: an integrated circuit, a microcomputer and a processor chip.

Access node 100 includes a transceiver 105 arranged to transmit at least one request to a neighboring access node 100. The transceiver 105 is also arranged to transmit requests and/or other transmissions to UEs 1 and/or other access nodes 100 as well as receive requests and/or other transmissions from UEs 1 and/or other access nodes 100 located in radio communications system 1000. In one embodiment, access node 100 is arranged to transmit radio resource reservation requests amongst other requests and/or other transmissions.

Access node 100 further includes a processing device providing verifying means 110 adapted to verify the class of the at least one request to be transmitted. The class indicates a priority of the at least one request and can be one from a plurality of classes, including a first class and at least one further class. Access node 100 further includes a controller 120 adapted to control the transmission of the at least one request depending upon the verified class as well as further adapted to control the functioning of access node 100 and to generate the different requests that are to be transmitted. The controller 120 is further arranged to immediately transmit a first class request. Access node 100 further includes a processing device providing assigning means 114 adapted to assign the class to the at least one request generated.

Controller 120 is further arranged to store in storage 115 requests that belong to at least one further class. Storage 115 can be a database, a RAM (Random Access Memory), a magnetic tape, a flash memory or the like. Furthermore, controller 120 is further arranged to control the transmission using at least one of the following: a timer 116 and at least one parameter of the request.

The timer 116 is arranged to provide a time value that the controller 120 is further arranged to use. When the time value expires, controller 120 is further adapted to effect the transmission of the at least one request having a class belonging to one of the at least one further class stored in storage 115.

The at least one parameter used by the controller 120 indicates at least one of the following: a location of the access node 100 originating the at least one request, an identification of the access node 100 originating the at least one request and a threshold value. The controller 120 is further adapted to insert information relating to the location, the identification and/or the class of the request into a request that is to be transmitted. The controller 120 is also further adapted to recognize and retrieve inserted information relating to the location, the identification and/or the class of a request and the like, when transceiver 105 receive a request.

The at least one parameter of the request indicates at least one of the following: a location of the access node 100 originating the request, an identification of the access node 100 originating the request, a class of the further request and a threshold value.

The controller 120 is further arranged to determine the threshold value, depending on the monitored performance indicators and/or statistical data gathered by the access node 100 or gathered and then transmitted by neighboring access nodes 100. The threshold value acts as a transmission control mechanism for generated requests. As long as the threshold value is not exceeded, controller 120 is arranged to proceed with the transmission of the further class request. Once the threshold value is exceeded, the controller 120 is arranged to stop the transmission of the further class request.

The location can be indicated by using the geographical position co-ordinates of the access node 100, for example retrieved by the controller 120 further arranged to use GPS (Global Positioning System) mechanisms, or by using a cell reference of the cell that the access node 100 is located in. The identification of the access node 100 can be an access node identifier, for example a numerical identity or a name of the access node, an address of the access node 100 used in radio communications system 1000, for example an IP (Internet Protocol) address, or an identifier indicating the number of hops (hop count) required to reach access node 100 from a defined point of reference within radio communications system 1000 or the number of hops indicating the hops taken by a request from the access node 100 having originated the request.

FIG. 4 is a further illustrative example of the method in the form of a sequence diagram. The illustrative example is further explained using access nodes 100 of cells 1-3, 1-4, 1-5, 1-6 which are identical to those depicted in FIG. 1. The sequence diagram depicts a possible sequence of events that can occur wherein the method is applicable. Each event occurring in the sequence is further designated by a reference sign t0, . . . , tmb in order to render FIG. 4 understandable.

In t0 access node 100 of cell 1-3 generates a request, this request can be for example a request for radio resources in the event that access node 100 detects that it does not have any available radio resources. In t1 a class is assigned by access node 100 to the generated request. In t2 access node 100 performs a verification of the class that has been assigned. In the example of FIG. 4, it is assumed that the access node 100 of cell 1-3 assigns a class to the request being a first class. As mentioned herein above a request having been assigned a first class is immediately transmitted in t3 to the neighboring access node 100 of cell 1-4.

In t4 access node 100 of cell 1-4 receives the transmitted request. In t5 a check is performed by access node 100 to verify the class of the request as well as whether the request can be fulfilled. In the example of FIG. 4, it is assumed that access node 100 of cell 1-4 has available radio resources enabling it to fulfill the request. Once the check has verified that the request can be fulfilled, access node 100 transmits a message in t5 indicating to the originating access node 100 that the request has been accepted. The message is received by access node 100 of cell 1-3 in t5a.

It then provides the radio resources in t6 which are received by access node 100 of cell 1-3 in t7. In an alternative embodiment, access node 100 of cell 1-4 transmits a message in t5 indicating to the originating access node 100 of cell 1-3 that the request has been accepted as well as at the same time providing the radio resources. In a further refinement not shown in FIG. 4, the receiving access node 100 transmits an acknowledgment message back to access node 100 of cell 1-4, before any radio resources are provided and/or after receiving the radio resources. When providing radio resources an access node 100 releases a certain number of frequencies from the number of frequencies that it has in order to provide services and radio connectivity within the cell that it controls. Once a received request has been checked and it is determined that the request can be accepted, controller 120 will release the frequencies. The information about which frequencies are to be released to the requesting access node 100-3 is then transmitted in t7 to the requesting access node 100-3. During the period of time that the frequencies have been released, the controller 120 of access node 100-4 will mark the released frequencies as being unavailable and access node 100-4 will not use them. Thus, for example, access node 100-3 can transmit on the released frequencies without however causing any interference to access node 100-4, as access node 100-4 will not use them.

In t8 a further event takes place at access node 100 of cell 1-4, wherein access node 100 of cell 1-4 generates a request similar to the request generated in t0 due to a lack of radio resources. In t9 a class is assigned by access node 100 to the generated request. In t10 access node 100 performs a verification of the class that has been assigned. In the example of FIG. 4, it is assumed that the access node 100 of cell 1-4 assigns a class to the request being a further class as described herein above. As mentioned herein above in the description, upon verifying that the request is a request having a class belonging to a further class, the request in not immediately transmitted but further control is applied on the request before it is transmitted. In the example of FIG. 4, this control is applied by using a timer. Once the timer expires the request is transmitted to neighboring access node 100 of cell 1-5 in t11.

In t12 access node 100 of cell 1-5 receives the transmitted request. In t13 a check is performed by access node 100 to verify the class of the request as well as whether the request can be fulfilled. In the example of FIG. 4, it is assumed that access node 100 of cell 1-5 does not have available radio resources enabling it to fulfill the request. In t14 access node 100 of cell 1-5 transmits a message indicating to access node 100 of cell 1-4 that the request is rejected. The message is received by access node 100 of cell 1-4 at t14a. In a further refinement not shown in FIG. 4, the message can also contain further information indicating that the request is to be forwarded to a further access node 100 or alternatively access node 100 of cell 1-5 waits for an acknowledgement of receipt from access node 100 of cell 1-4, prior to indicating that the request is to be forwarded. The forwarding of the request is performed in t15 and is transmitted to neighboring access node 100 of cell 1-6.

In t16 access node 100 of cell 1-6 receives the transmitted request. In t17 a check is performed by access node 100 to verify the class of the request as well as whether the request can be fulfilled. In the example of FIG. 4, it is assumed that access node 100 of cell 1-6 has available radio resources enabling it to fulfill the request. Once the check has verified that the request can be fulfilled, access node 100 transmits a message in t18 indicating to access node 100 of cell 1-5 that the request has been accepted. The message is received in t18a. It then provides the radio resources in t19 which are received by access node 100 of cell 1-5 in t20. In a further refinement not shown in FIG. 4, the receiving access node 100 of cell 1-5 transmits an acknowledgment message back to access node 100 of cell 1-6, before any radio resources are provided.

Access node 100 of cell 1-5 in turn will then provide the radio resources to access node 100 of cell 1-4 in t20a. In a further refinement not shown in FIG. 4, access node 100 of cell 1-5 transmits a message to access node 100 of cell 1-4 indicating that it has the required radio resources. Upon receiving an acknowledgement from access node 100 of cell 1-4, access node 100 of cell 1-5 provides the radio resources.

At an event tk access node 100 of cell 1-3 does not require the radio resources that it has received. It will then release those radio resources back to access node 100 of cell 1-4, which will receive them in tka. In a further refinement not shown in FIG. 4, access node 100 of cell 1-3 transmits a message to access node 100 of cell 1-4 indicating that it will release the radio resources and upon reception of an acknowledgement from access node 100 of cell 1-4 releases the resources. The same applies for event tm when access node 100 of cell 1-4 does not require the radio resources that it has received. In this case the released radio resources will be first released back to access node 100 of cell 1-5 which receives them in tma which in turn will provide them back to access node 100 of cell 1-6, which will receive them in tmb.

The system also includes permanent or removable storage, such as magnetic and optical discs, RAM, ROM, etc. on which the process and data structures of the present invention can be stored and distributed. The processes can also be distributed via, for example, downloading over a network such as the Internet. The system can output the results to a display device, printer, readily accessible memory or another computer on a network.

Although the invention has been described in terms of preferred embodiments and refinements described herein, those skilled in the art will appreciate other embodiments and modifications which can be made without departing from the scope of the teachings of the invention. All such modifications are intended to be included within the scope of the claims appended hereto which may include the phrase "at least one of A, B and C" as an alternative expression that means one or more of A, B and C may be used, contrary to the holding in *Superguide* v. *DIRECTV*, 358 F3d 870, 69 USPQ2d 1865 (Fed. Cir. 2004).

The invention claimed is:

1. A method for controlling transmission of at least one request which is a radio resource request between a first access node of a plurality of access nodes and at least one neighboring access node, in a radio communications system, comprising:
   verifying a class of a plurality of classes of the at least one request to be transmitted, the class being assigned by the first access node indicating a priority of the at least one request, and
   controlling the transmission of the at least one request depending upon one or more of the class that was verified, a timer and at least one parameter of the request, and
   wherein radio resource management is configured to be distributed throughout the radio communications system in form of the plurality of access nodes and the first access node as a radio resource management unit requests the radio resource request with the assigned class, and
   wherein said controlling the transmission is predefined or dynamically selected to be controlled using at least one of a timer and at least one parameter of the request, and
   wherein the timer uses a time value, and
   wherein upon expiration of the time value, said controlling the transmission of the at least one request having a class belonging to one of the at least one further class is effected.

2. A method according to claim 1, wherein the plurality of classes includes a first class and at least one further class.

3. A method according to claim 2, wherein a first class request is transmitted immediately.

4. A method according to claim 3, wherein said controlling the transmission is predefined or dynamically selected to be controlled using at least one of a timer and at least one parameter of the request.

5. A method according to claim 4, wherein the at least one parameter indicates at least one of a location of the first access node originating the at least one request, an identification of the first access node originating the at least one request and a threshold value.

6. A method for controlling transmission of at least one request which is a radio resource request between a first access node of a plurality of access nodes and at least one neighboring access node, in a radio communications system, comprising:
   verifying a class of a plurality of classes of the at least one request to be transmitted, the class being assigned by the first access node indicating a priority of the at least one request, and
   controlling the transmission of the at least one request depending upon one or more of the class that was verified, a timer and at least one parameter of the request, and
   wherein radio resource management is configured to be distributed throughout the radio communications system in form of the plurality of access nodes and the first access node as a radio resource management unit requests the radio resource request with the assigned class, and
   wherein said controlling the transmission is predefined or dynamically selected to be controlled using at least one of a timer and at least one parameter of the request,
   wherein the at least one parameter indicates at least one of a location of the first access node originating the at least one request, an identification of the first access node originating the at least one request and a threshold value, and
   wherein upon the threshold value being exceeded, said controlling the transmission stops the at least one request having a class belonging to one of the at least one further class.

7. A method according to claim 6, wherein the plurality of classes includes a first class and at least one further class.

8. A method according to claim 7, wherein a first class request is transmitted immediately.

9. An access node controlling transmission of at least one request which is a radio resource request to at least one neighboring access node of a plurality of access nodes in a radio communications system, comprising:
   transceiver means for transmitting radio resource requests;
   verifying means for verifying a class of a plurality of classes of the at least one request to be transmitted by said transceiver means from the access node to the at least one neighboring access node, including assigning means for assigning the class indicating a priority of the at least one request, and
   controlling means for controlling the transmission of the at least one request depending upon one or more of the class that was verified, a timer and at least one parameter of the request, and
   wherein managing means for managing a radio resource is distributed throughout the radio communications system in form of the plurality of access nodes and the managing means causes the radio resource request with the assigned class, wherein said controlling means is predefined or dynamically selected to be control the transmission using at least one of a timer and at least one parameter of the request, and wherein said controlling means uses a time value of the timer and upon expiration of the time value said controlling means further effects the transmission of the at least one request having a class belonging to one of the at least one further class.

10. An access node according to claim 9, wherein said access node is one of a base station controller and a radio network controller.

11. A radio communications system having a plurality of access nodes, comprising:

at least two access nodes controlling transmission of at least one request which is a radio resource request to at least one neighboring access node of the radio communications system, each access node including transceiver means for transmitting radio resource requests;

verifying means for verifying a class of a plurality of classes of the at least one request to be transmitted by said transceiver means from the access node to the at least one neighboring access node, including assigning means for assigning the class indicating a priority of the at least one request, and controlling means for controlling the transmission of the at least one request depending upon one or more of the class that was verified, a timer and at least one parameter of the request, and wherein managing means for managing a radio resource is distributed throughout the radio communications system in form of the plurality of access nodes and a radio resource management means transmits the radio resource request with the assigned class, wherein said controlling means is predefined or dynamically selected to be control the transmission using at least one of a timer and at least one parameter of the request, and wherein said controlling means uses a time value of the timer and upon expiration of the time value said controlling means further effects the transmission of the at least one request having a class belonging to one of the at least one further class.

* * * * *